United States Patent [19]

Sauer

[11] Patent Number: 5,040,829
[45] Date of Patent: Aug. 20, 1991

[54] HOSE COUPLING

[75] Inventor: Heinz Sauer, Ronnesburg, Fed. Rep. of Germany

[73] Assignee: Rasmussen GmbH, Maintal, Fed. Rep. of Germany

[21] Appl. No.: 345,633

[22] Filed: May 1, 1989

[30] Foreign Application Priority Data

May 4, 1988 [DE] Fed. Rep. of Germany ....... 3815171

[51] Int. Cl.5 .............................................. F16L 33/20
[52] U.S. Cl. .................................. 285/256; 285/319; 285/921
[58] Field of Search ............... 285/174, 256, 319, 257, 285/382, 94

[56] References Cited

U.S. PATENT DOCUMENTS

| 244,804 | 7/1881 | Gillespie | 285/382 X |
| 647,022 | 4/1900 | Paradice | 285/257 |
| 718,599 | 1/1903 | Bubb | 285/319 |
| 1,043,683 | 11/1912 | Fieser | 285/319 |
| 1,487,389 | 3/1924 | King | 285/382 X |
| 1,904,061 | 4/1933 | Larson | 285/319 X |
| 1,936,669 | 11/1933 | Heeter | 285/382 X |
| 2,574,625 | 11/1951 | Coss | 285/382 X |
| 4,186,946 | 2/1980 | Snow | 285/256 |
| 4,226,446 | 10/1980 | Burrington | 285/256 |
| 4,679,827 | 7/1987 | Law | 285/319 X |
| 4,682,798 | 7/1987 | Sauer | 285/921 X |
| 4,697,832 | 10/1987 | Dickirson | 285/319 |
| 4,753,459 | 6/1988 | Potier | 285/260 X |
| 4,775,173 | 10/1988 | Sauer | 285/174 |

FOREIGN PATENT DOCUMENTS 809274 7/1951 Fed. Rep. of Germany ...... 285/257
641315 8/1950 United Kingdom ............... 285/921

Primary Examiner—Dave W. Arola
Attorney, Agent, or Firm—Peter K. Kontler

[57] ABSTRACT

A coupling which serves to connect the nipple of a pipe to the end portion of a hose has a sleeve with a tubular section insertable into the end portion of the hose and one or more flexible prongs which extend from one axial end of the tubular section and can be bent into engagement with an external retainer of the nipple. The prongs are made of a ductile metallic material. A sealing ring is inserted between the exterior of the nipple and the interior of the tubular section, and a tubular clamping member is used to urge the end portion of the hose against the external surface of the tubular section of the sleeve. The prongs are spread apart during introduction of the nipple into the sleeve, and are thereupon flexed inwardly to engage the retainer.

6 Claims, 1 Drawing Sheet

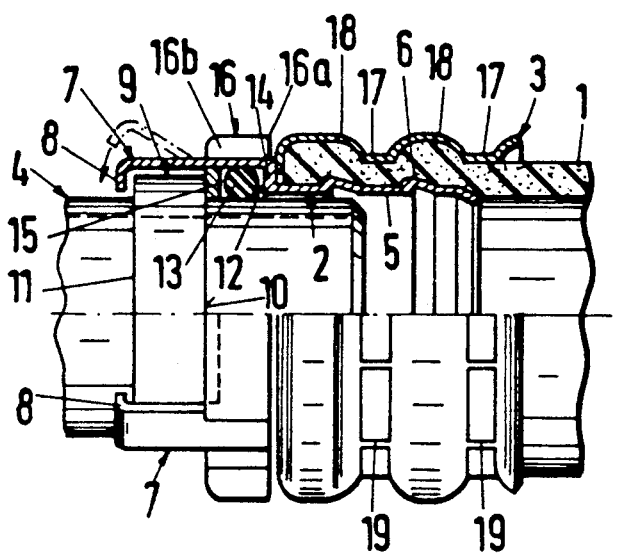
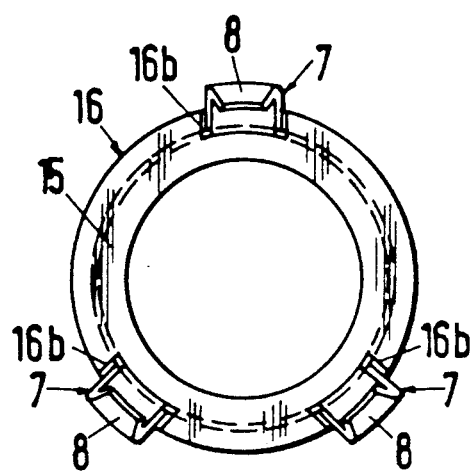
Fig.1  Fig.2
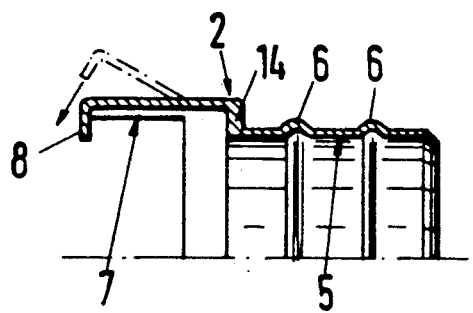
Fig.3

HOSE COUPLING

CROSS-REFERENCE TO RELATED CASES

The hose coupling of the present invention is similar to those which are disclosed in six commonly owned copening patent applications Ser. No. 345,635, now U.S. Pat. No. 4,969,668, Nov. 13,1990, Ser. No. 345,652, Ser. No. 345,636, Ser. No. 345,632, now U.S. Pat. No. 4,978,149, Dec. 18, 1990, Ser. No. 345,680, now U.S. Pat. No. 4,969,667, Nov. 13, 1990 and Ser. No. 345,679, now U.S. Pat. No. 4,969,669, Nov. 13, 1990.

BACKGROUND OF THE INVENTION

The invention relates to couplings in general, and more particularly to improvements in couplings which can be used to sealingly and separably connect an end portion (e.g., a nipple) of a first tubular component (such as a metallic or plastic pipe) with an end portion of a second tubular component (e.g., an elastic hose of rubber or plastic material). Still more particularly, the invention relates to improvements in couplings of the type wherein a sleeve-like tubular coupling member has a circumferentially complete tubular section which is insertable into the end portion of the second component and one or more prong-like flexible coupling elements which engage an external retainer of the end portion of the first component in assembled condition of the coupling. Such couplings are normally further provided with one or more sealing elements which are interposed between the end portion of the first component and the internal surface of tubular section of the tubular coupling member, and with means for clamping the end portion of the second component against the exterior of the tubular section.

Commonly owned U.S. Pat. No. 4,775,173 to Sauer discloses a hose coupling wherein the tubular coupling member is made of a plastic material and its tubular section is integral with elastically deformable prong-shaped coupling elements. The nipple of the pipe which is to be sealingly connected with an end portion of a flexible hose has an external rib with a frustoconical flank serving as a means for spreading the coupling elements apart during introduction of the nipple into the tubular section. When the nipple is properly inserted into the tubular coupling member, the prongs engage a radially extending flank of the rib and thus prevent accidental extraction of the nipple in assembled condition of the coupling.

A drawback of the patented coupling is that a rather strong force is required to spread the prongs apart during assembly of the coupling because the rib at the exterior of the nipple deflects only a small component of the axially applied force in the radial direction of the nipple. The situation is aggravated if the prongs are made of a relatively stiff resilient material which offers a pronounced resistance to elastic deformation.

OBJECTS OF THE INVENTION

An object of the invention is to provide a coupling, particularly a hose coupling, which is constructed in such a way that it can be assembled by exertion of a relatively small force.

Another object of the invention is to provide a novel and improved sleeve-like tubular coupling member for use in the above outlined coupling.

A further object of the invention is to provide novel and improved prong-like flexible coupling elements for use in the above outlined coupling.

An additional object of the invention is to provide a novel and improved method of reducing the resistance which the parts of the coupling offer to assembly with the tubular components.

Still another object cf the invention is to provide a simple and inexpensive hose coupling which can be used to separably and fluidtightly connect a metallic or plastic nipple with the end portion of an elastic hose or a like tubular component.

SUMMARY OF THE INVENTION

The invention is embodied in a coupling which is used to establish a separable fluidtight connection between end portions of first and second tubular components, particularly between an end portion (e.g., a nipple) of a pipe and an end portion of an elastic hose. The improved coupling comprises a substantially sleeve-like tubular coupling member which includes a tubular section receivable at least in part in the end portion of the second component, and at least one flexible coupling element which serves to engage a retainer (e.g., a circumferentially complete rib) at the exterior of the end portion of the first component. In accordance with a feature of the invention, at least the at least one coupling element of the tubular coupling member is made of a ductile material.

The at least one coupling element is flexible in directions toward and away from the axis of the tubular coupling member, and the coupling further comprises at least one tubular sealing element (e.g., an 0-ring) which is insertable between the tubular section and the exterior of the end portion of the first component, and means for sealingly urging the end portion of the second component against the exterior of the tubular section. The tubular section has an internal surface which can be provided with a groove for the sealing element.

When not deformed, the at least one coupling element normally extends (or can extend) in substantial parallelism with the axis of the tubular coupling member. Alternatively, the arrangement may be such that the at least one coupling element is substantially parallel to the axis of the tubular coupling member when it engages the retainer at the exterior of the end portion of the first component.

The tubular coupling member can be made of a non-elastic metallic sheet material.

Each flexible coupling element preferably extends from the same axial end of the tubular section and, if the tubular coupling member comprises two or more coupling elements, such coupling elements are preferably equidistant from each other in the circumferential direction of the tubular section.

The novel features which are considered as characteristic of the invention are set forth in particular in the appended claims. The improved coupling itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a partly elevational and partly axial sectional view of a hose coupling which embodies one form of the present invention;

FIG. 2 is an end elevational view of the coupling, substantially as seen from the left-hand side of FIG. 1, with the first tubular component omitted; and FIG. 3 is a fragmentary axial sectional view of a sleeve-like tubular coupling member which can be used in the improved hose coupling.

DESCRIPTION OF PREFERRED EMBODIMENTS

The coupling which is shown in FIGS. 1 and 2 is designed to connect a nipple 4 which constitutes an end portion of a metallic or plastic pipe (first tubular component) with one end portion of a second tubular component in the form of a flexible hose 1 made of rubber or elastomeric plastic material. The coupling comprises essentially a sleeve-like tubular coupling member 2 (hereinafter called sleeve), an annular sealing element 13 (e.g., an O-ring), and a tubular clamping member 3. When the improved coupling is assembled, the nipple 4 extends into the sleeve 2 and at least a circumferentially complete tubular section 5 of the sleeve 2 is received in the end portion of the hose 1. At such time, the clamping member 3 urges the end portion of the hose 1 into sealing engagement with the external surface of the tubular section 5.

The tubular section 5 is formed with one or more (e.g., two) outwardly extending corrugations 6 which cooperate with corrugations 17 and 18 of the clamping member 3 to sealingly confine the end portion of the hose 1 between the tubular section 5 and the clamping member as well as to prevent extraction of the end portion of the hose from the space between the section 5 and clamping member. At least that portion of each corrugation 6 which is nearer to the right-hand end of the tubular section 5 preferably resembles or constitutes a hollow conical frustum in order to facilitate insertion of the tubular section 5 into the end portion of the hose 1.

The inner diameter of the tubular section 5 is only slightly greater than the outer diameter of the nipple 4.

The sleeve 2 further comprises one or more (e.g., three) flexible prong-shaped coupling elements 7 (hereinafter called prongs) which are integral with the left-hand axial end of the tubular section 5 (as seen in FIG. 1) and have free end portions 8 in the form of inwardly extending hooks engageable with the radial flank 11 of a cylindrical retainer 9 at the exterior of the nipple 4. When the coupling is assembled, the prongs 7 extend beyond the end portion of the hose 1 and their main portions are substantially parallel with the axis of the tubular section 5 (this is shown in FIG. 1 by solid lines). FIG. 2 shows that the three prongs 7 are equidistant from each other in the circumferential direction of the sleeve 2 and of its tubular section 5. Each prong 7 is flexible inwardly and outwardly substantially radially of the sleeve 2 about its locus of connection to the respective axial end of the tubular section 5. The retainer 9 of the nipple 4 is a circumferentially complete cylindrical collar of constant diameter. The plane of the flank 11 is parallel with the plane of a second flank 10 at that side of the retainer 9 which confronts the end portion of the hose 1 in assembled condition of the coupling.

The internal surface of the tubular section 5 is provided with a circumferentially complete groove 12 for the annular sealing element 13. The dimensions of this sealing element are selected in such a way that it is maintained in sealing engagement with the surface bounding the groove 12 as well as with the adjacent portion of external surface of the nipple 4 in assembled condition of the coupling. At such time, the sealing element 13 prevents escape of a fluid from the nipple 4 and/or hose 1 along the external surface of the nipple, and the properly shrunk or otherwise deformed clamping member 3 cooperates with the tubular section 5 to prevent escape of fluid from the nipple 4 and/or hose 1 along the external surface of the tubular section 5.

The groove 12 for the sealing element 13 is defined by a further corrugation of the sleeve 2. This corrugation includes two axially spaced apart radial walls 14, 15. The wall 15 forms part of a ring 16 which includes an axially extending portion 16a with axially parallel notches or recesses 16b for the prongs 7. The ring 16 surrounds a portion of the tubular section 5 which is outwardly adjacent the clamping member 3.

The material of the sleeve 2 is such that the prongs 7 can be flexed to any one of a number of different positions without exhibiting a tendency to reassume the earlier position. In accordance with a presently preferred embodiment, the sleeve 2 is made of non-elastic flexible ductile metallic sheet material.

The corrugations 6 of the tubular section 5 can be made simultaneously with or prior to the making of corrugations 17, 18 in the clamping member 3. The corrugations 17 flank one of the corrugations 6 and each corrugation 6 is disposed radially inwardly of and is surrounded by one of the corrugations 18. Thus, the corrugations 6 urge the material of the end portion of the hose 1 into the interior of the respective corrugations 18. The making of corrugations 17 and 18 results in the making of axially parallel creases 19 in the region of corrugations 17. Such creases enhance the rigidity of the clamping member 3, particularly the resistance of the clamping member to bending stresses. The corrugations 6, 17 and 18 cooperate to reliably hold the end portion of the hose 1 against extraction from the space between the deformed clamping member 3 and the tubular section 5 of the sleeve 2.

The sleeve 2 is assembled with the ring 16, with the end portion of the hose 1 and with the clamping member 3 prior to insertion of the nipple 4 into the resulting assembly, namely into the sleeve 2 so that the prongs 7 are outwardly adjacent the nipple. As mentioned above, at least some of the corrugations 6, 17 and 18 can be made prior to assembly of the end portion of the hose 1 with the clamping member 3 and/or sleeve 2. It is presently preferred to make the corrugations 6 prior, and to make the corrugations 17 and 18 subsequent, to insertion of the sleeve 2 into the end portion of the hose 1 and deformation of the clamping member 3 around the hose. If desired or necessary, a volatile friction reducing medium can be applied to the exterior of the tubular section 5, to the interior of the end portion of the hose 1, to the exterior of the end portion of the hose 1 and/or to the interior of the clamping member 3 in order to facilitate assembly of these parts into a unit which is ready to receive the nipple 4.

The free end portions 8 of the prongs 7 are moved radially outwardly to assume the phantomline positions of FIGS. 1 and 3 (corresponding to the solid-line positions of FIG. 2) before the nipple 4 is introduced into the ring 16 and sleeve 2. This ensures that the nipple 4 can readily pass through the space within the outwardly bent prongs 7. Insertion of the nipple 4 into the sleeve 2 is completed when the radially inwardly extending washer-like wall 15 of the ring 16 comes into abutment with the radially extending flank 10 of the retainer 9. The prongs 7 are then bent radially inwardly so that their end portions 8 engage the flank 11 and thus ensure that the nipple 4 cannot be extracted from the sleeve 2 except after renewed flexing of the ductile prongs 7 to the positions which are shown in FIG. 2 by solid lines and are shown by phantom lines in FIGS. 1 and 3. The direction in which the upper prong of FIG. 1 must be flexed to ensure that its end portion 8 engages or assumes a position adjacent the flank 11 is indicated by an arrow.

An advantage of the improved coupling is that insertion of the nipple 4 into the sleeve 2 necessitates the exertion of a relatively small effort. This is due to the fact that the prongs 7 need not be caused to pivot during such insertion but are simply bent to the expanded or inoperative positions of FIG. 2 before the insertion of the nipple 4 into the assembly including the sleeve 2, ring 16, end portion of the hose 1 and clamping member 3 begins. Moreover, it is possible to simplify the making of the nipple 4 because the retainer 9 need not be formed with a frustoconical flank or ramp of the type disclosed in the aforediscussed patent to Sauer. It has been found that a coupling which employs a sleeve-like tubular coupling member with ductile prongs can readily stand reasonable or even pronounced stresses acting in a direction to extract the nipple 4 from the parts 1, 2, 3 and 16.

Still another advantage of the improved coupling is that the making of corrugations 6 is a simple operation because the sleeve 2 is made of a ductile material. The making of such corrugations involves a relatively simple and inexpensive pressing or rolling operation. The material of the clamping member 3 may be identical with the material of the sleeve 2.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coupling for establishing a separable fluidtight connection between end portions of first and second tubular components, particularly between an end portion of a pipe and an end portion of a hose, comprising a substantially sleeve-like tubular coupling member consisting of non-elastic metallic sheet material and including a tubular section receivable in the end portion of the second component and at least one ductile flexible coupling element integral with said tubular section and arranged to engage an external retainer on the end portion of the first component; a ring surrounding said at least one coupling element and having a substantially radially inwardly extending first wall defining with said tubular section an annular groove; and an annular sealing element provided in said groove and arranged to engage the end portion of the first component, said wall having a slot for said at least one coupling element and said tubular section having a second wall, said groove being disposed between said walls.

2. The coupling of claim 1, wherein said at least one coupling element is flexible in directions toward and away from the axis of the tubular section, said at least one annular sealing element being insertable between said tubular section and the exterior of the end portion of the first component, and further comprising means for sealingly urging the end portion of the second component against the exterior of said tubular section.

3. The coupling of claim 2, wherein said at least one coupling element normally extends in substantial parallelism with the axis of said tubular section.

4. The coupling of claim 2, wherein said tubular section has an internal surface and said groove is provided in said internal surface.

5. The coupling of claim 1, wherein said tubular section has a first end and a second end and said tubular coupling member comprises a plurality of flexible coupling elements each integral with the first end of said tubular section.

6. The coupling of claim 5, wherein said coupling elements are equidistant from each other in the circumferential direction of said tubular section.

* * * * *